(12) United States Patent
Hayashi

(10) Patent No.: US 9,681,384 B2
(45) Date of Patent: Jun. 13, 2017

(54) COMMUNICATION APPARATUS AND METHOD FOR CONTROLLING COMMUNICATION APPARATUS

(71) Applicant: CANON KABUSHIKI KAISHA, Tokyo (JP)

(72) Inventor: Kenichirou Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/735,497

(22) Filed: Jun. 10, 2015

(65) Prior Publication Data
US 2015/0365899 A1 Dec. 17, 2015

(30) Foreign Application Priority Data
Jun. 12, 2014 (JP) .................................. 2014-121848

(51) Int. Cl.
H04L 29/06 (2006.01)
H04W 52/02 (2009.01)
H04W 4/00 (2009.01)

(52) U.S. Cl.
CPC ......... *H04W 52/0235* (2013.01); *H04L 69/14* (2013.01); *H04L 69/18* (2013.01); *H04W 4/008* (2013.01); *H04W 52/0229* (2013.01); *Y02B 60/50* (2013.01)

(58) Field of Classification Search
CPC .............................. H04L 69/18; H04W 4/008
See application file for complete search history.

(56) References Cited

U.S. PATENT DOCUMENTS

| 2007/0178935 | A1* | 8/2007 | Shim .................. H04W 52/0235 455/552.1 |
| 2010/0068997 | A1* | 3/2010 | Dunko .................. H04W 4/001 455/41.1 |
| 2010/0254349 | A1* | 10/2010 | Aibara ................ H04W 36/385 370/331 |
| 2011/0106954 | A1* | 5/2011 | Chatterjee ............. G06F 1/1632 709/227 |

(Continued)

FOREIGN PATENT DOCUMENTS

EP 1 809 056 A2 7/2007
EP 2 711 864 A1 3/2014

(Continued)

OTHER PUBLICATIONS

Extended European Search Report issued on Nov. 26, 2015, that issued in the corresponding European Patent Application No. 15171964.8.

*Primary Examiner* — David Bilodeau
(74) *Attorney, Agent, or Firm* — Cowan, Liebowitz & Latman, P.C.

(57) ABSTRACT

There is provided a communication apparatus. A proximity communication unit is adapted to communicate with an external apparatus by proximity wireless communication. A control unit is configured to control an operation of the communication apparatus. The proximity communication unit provides a notification to the control unit in response to receiving a write request from the external apparatus via the proximity wireless communication. The proximity communication unit does not provide a notification to the control unit in response to receiving a read request from the external apparatus via the proximity wireless communication.

20 Claims, 5 Drawing Sheets

(56) References Cited

U.S. PATENT DOCUMENTS

| | | | | |
|---|---|---|---|---|
| 2012/0178421 A1* | 7/2012 | Fujii | ...................... | H04L 63/08 |
| | | | | 455/411 |
| 2013/0229685 A1* | 9/2013 | Naruse | .................. | G06F 3/1207 |
| | | | | 358/1.15 |
| 2014/0342665 A1* | 11/2014 | Amano | ............. | H04W 52/0229 |
| | | | | 455/41.1 |
| 2014/0378052 A1* | 12/2014 | Hamada | ................ | G06F 1/3225 |
| | | | | 455/41.1 |
| 2015/0326999 A1* | 11/2015 | Foesser | ............... | H04L 41/0809 |
| | | | | 455/41.1 |

FOREIGN PATENT DOCUMENTS

| | | |
|---|---|---|
| JP | 2002-204239 A | 7/2002 |
| WO | 2013/111537 A1 | 8/2013 |

\* cited by examiner

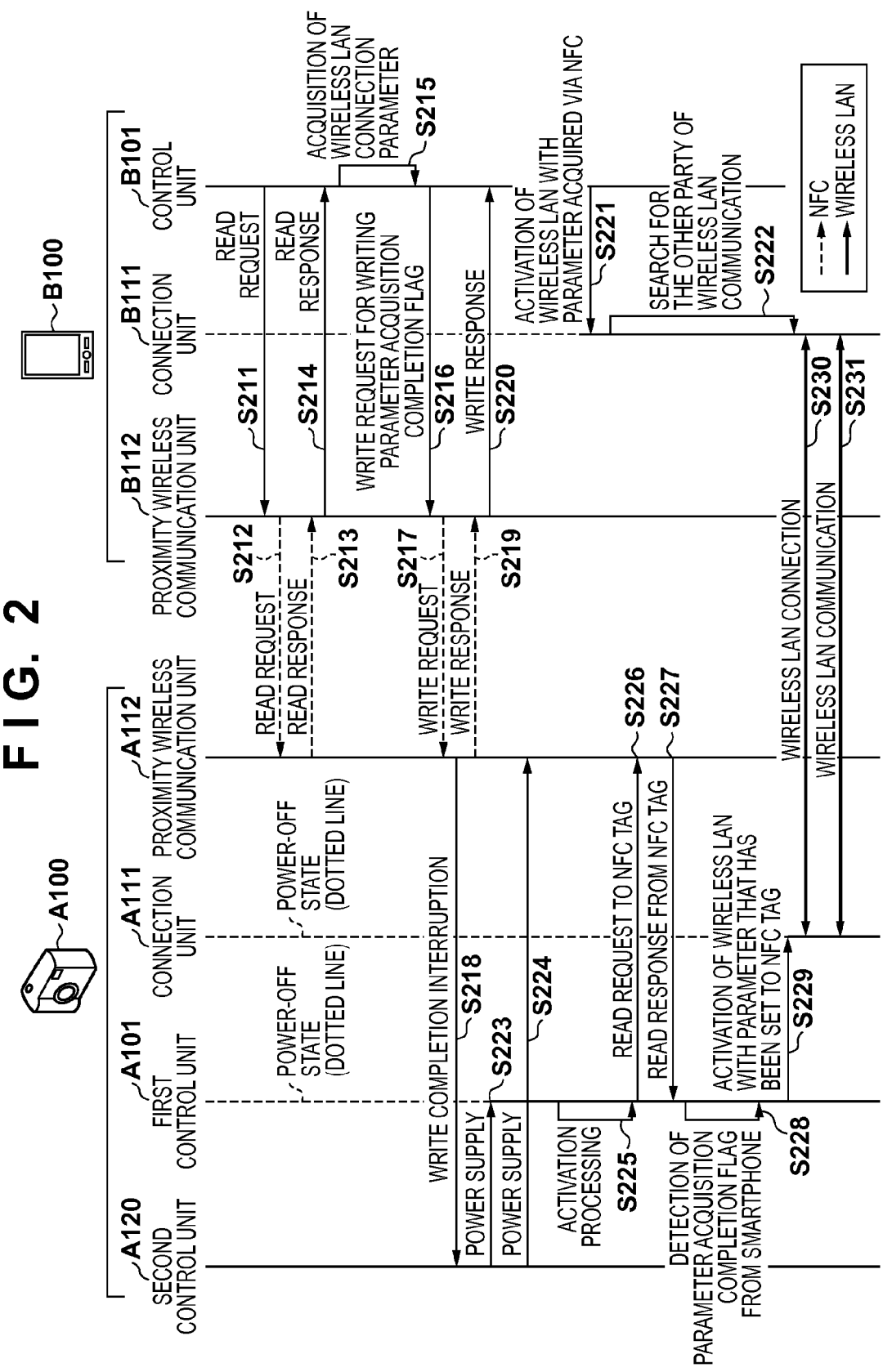

COMMUNICATION APPARATUS AND METHOD FOR CONTROLLING COMMUNICATION APPARATUS

BACKGROUND OF THE INVENTION

Field of the Invention

The present invention relates to a communication apparatus and a method for controlling a communication apparatus.

Description of the Related Art

Regarding communication between two communication apparatuses each having two types of wireless communication functions, a technology is now known of using a first wireless communication function to exchange therebetween a parameter for a second wireless communication function, and thereby achieving easy establishment of wireless connection via the second wireless communication function. For example, Japanese Patent Laid-open No. 2002-204239 discloses that a personal computer reads a telephone number recorded on a RF tag embedded in a mobile telephone, and communication between the personal computer and the mobile telephone is performed based on this telephone number. It is also known that a digital camera having a wireless LAN communication function and a proximity wireless communication function uses the proximity wireless communication function to provide a smartphone with a parameter required for establishing wireless LAN connection, and thereby achieves easy establishment of wireless LAN connection with the smartphone.

Among digital cameras equipped with the proximity wireless communication function, some cameras can go into a power saving state in which power supply to the proximity wireless communication function is stopped. When a smartphone is brought into the proximity of a digital camera that is in the power saving state, the proximity wireless communication function operates by transforming the magnetic field generated by the smartphone into electrical power, and provides an interruption notification to a power control CPU of the digital camera. Upon receipt of the interruption notification, the power control CPU causes the digital camera to recover to the normal state, and starts power supply to the proximity wireless communication function. After that, the digital camera can perform processing corresponding to the cause of the occurrence of the interruption notification.

It takes a certain amount of time from when the interruption notification occurs to when the digital camera recovers to the normal state, and the smartphone may be moved apart from the digital camera during this period. If this is the case, the digital camera, which has recovered to the normal state, may not be able to find out the cause of the occurrence of the interruption notification, and may not be able to perform appropriate processing. Japanese Patent Laid-open No. 2002-204239 does not take the power saving state into consideration, and cannot address such a problem.

SUMMARY OF THE INVENTION

The present invention is made in view of the above situation, and provides a technology for finding out the cause of recovery to the normal state when a communication apparatus such as a digital camera recovers from the power saving state to the normal state.

According to a first aspect of the present invention, there is provided a communication apparatus comprising: a proximity communication unit configured to communicate with an external apparatus by proximity wireless communication; and a control unit configured to control an operation of the communication apparatus, wherein the proximity communication unit provides a notification to the control unit in response to receiving a write request from the external apparatus via the proximity wireless communication, and the proximity communication unit does not provide a notification to the control unit in response to receiving a read request from the external apparatus via the proximity wireless communication.

According to a second aspect of the present invention, there is provided a communication apparatus comprising: a proximity communication unit configured to communicate with an external apparatus by proximity wireless communication; and a control unit configured to control an operation of the communication apparatus, wherein the communication apparatus has a plurality of states including a first state, and a second state in which the communication apparatus consumes a smaller amount of power than in the first state, the communication apparatus switches to the first state in response to the proximity communication unit receiving a write request from the external apparatus, and the communication apparatus does not switch to the first state in response to the proximity communication unit receiving a read request from the external apparatus.

According to a third aspect of the present invention, there is provided a method for controlling a communication apparatus, the communication apparatus comprising: a proximity communication unit configured to communicate with an external apparatus by proximity wireless communication; and a control unit configured to control an operation of the communication apparatus, the method comprising providing, by the proximity communication unit, a notification to the control unit in response to receiving a write request from the external apparatus via the proximity wireless communication, wherein the proximity communication unit does not provide a notification to the control unit in response to receiving a read request from the external apparatus via the proximity wireless communication.

Further features of the present invention will become apparent from the following description of exemplary embodiments with reference to the attached drawings.

BRIEF DESCRIPTION OF THE DRAWINGS

FIG. 2 is a sequence diagram showing a processing flow from when a digital camera A100 operating in a power saving state performs proximity wireless communication with a smartphone B100 to when the digital camera A100 establishes wireless LAN communication.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

The embodiments described below are exemplary means for realizing the present invention, and may be modified or changed as appropriate, depending on the configuration of the apparatus to which the invention is applied and various conditions. The individual embodiments can also be combined as appropriate.

First Embodiment

Figure 1:
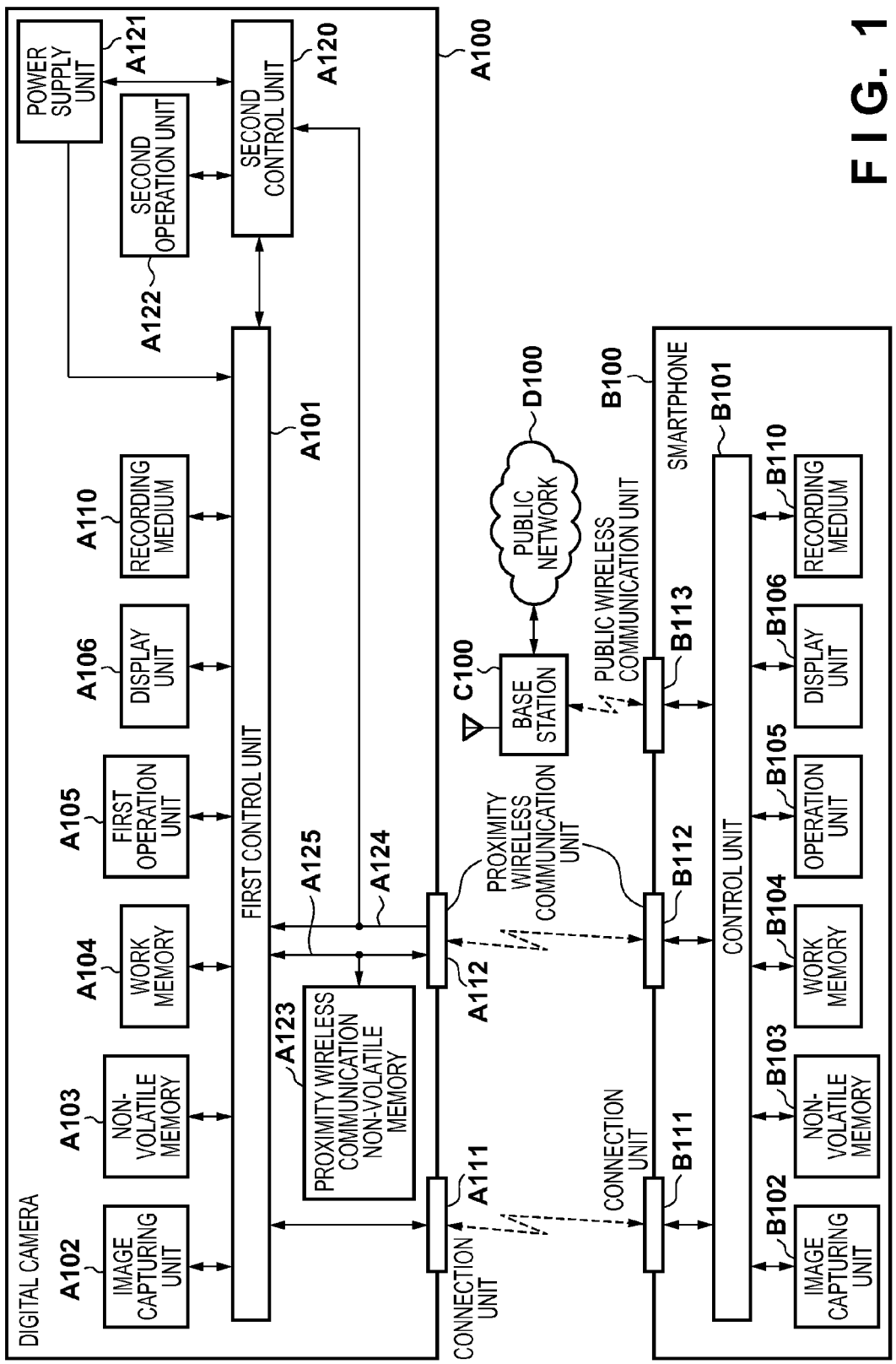
FIG. 1 is a block diagram showing an overall configuration of a communication system according to a first embodiment.

FIG. 1 is a block diagram showing an overall configuration of a communication system according to the first embodiment. The following describes, as examples of communication apparatus, a digital camera and a smartphone each serving as an image capturing apparatus as well. Note, however that the communication apparatus is not limited to them, and may be a portable media player, a tablet device, or an information processing apparatus such as a personal computer.

First, a description is given to a digital camera A100. A first control unit A101 controls each unit of the digital camera A100 according to an input signal and a program described below. Note that the entire apparatus may be controlled by a plurality of pieces of hardware that share the processing, instead of by the first control unit A101.

An image capturing unit A102 includes, for example, an optical lens unit, an optical system that controls the aperture, zooming, focusing, etc., and an image sensor for converting the light (image) guided thereto via the optical lens unit into an electrical image signal. As an example of the image sensor, a complementary metal oxide semiconductor (CMOS) or charge coupled device (CCD) image sensor is commonly used. Under the control of the first control unit A101, the image capturing unit A102 converts an optical image of the subject formed by a lens included in the image capturing unit A102 into an electrical signal by using the image sensor, then performs noise reduction processing, etc., and outputs digital data as image data. The digital camera A100 according to the present embodiment records the image data on a recording medium A110 in conformity with the design rule for camera file system (DCF) standard.

A non-volatile memory A103 is an electrically erasable/recordable non-volatile memory, and stores therein, for example, a program described below, which is executed by the first control unit A101. A work memory A104 is used as, for example, a buffer memory for temporarily storing image data captured by the image capturing unit A102, an image display memory for a display unit A106, a work area for the first control unit A101, etc.

A first operation unit A105 receives an operation input from a touch panel formed on the display unit A106 described below. For example, on the display unit A106, the user can touches a subject displayed by the display unit A106. In this case, the first operation unit A105 receives an instruction to perform preparations for still image capturing corresponding to a touched position, such as autofocus (AF) processing, auto exposure (AE) processing, auto white balance (AWB) processing, and pre-flash emission (EF) processing. The first operation unit A105 is also used for inputting characters and the likes by a touch operation via a virtual keyboard displayed by the display unit A106.

The display unit A106 performs, for example, displaying of a live view during the preparations of still image capturing, displaying of captured still image data, and displaying of characters used for an interactive operation. Note that the display unit A106 is not necessarily included in the digital camera A100. The digital camera A100 can be connected not only with the display unit A106 provided for example on the rear surface of the camera, but also with a display unit A106 that is external to the camera, and is required to have at least a display control function to control displaying performed by the display unit A106.

The recording medium A110 can record image data output by the image capturing unit A102. The recording medium A110 may be configured to be attachable to and detachable from the digital camera A100, or embedded in the digital camera A100. In other words, the digital camera A100 is required to have at least the function of accessing the recording medium A110.

A connection unit A111 is an interface used for connecting with an external apparatus. The digital camera A100 according to the present embodiment can exchange data with an external apparatus via the connection unit A111. Note that examples of the connection unit A111 according to the present embodiment include an interface for communication with an external apparatus via a so-called wireless LAN in conformity with the IEEE 802.11 standard. The first control unit A101 achieves wireless communication with an external apparatus by controlling the connection unit A111.

A proximity wireless communication unit A112 is located at a side part of the digital camera A100, for example, and includes an antenna for wireless communication, modulation/demodulation circuitry for processing a wireless signal, a communication controller, etc. The proximity wireless communication unit A112 outputs a modulated wireless signal from the antenna, and demodulates wireless signal received from the antenna. Assume that the proximity wireless communication unit A112 according to the present embodiment performs non-contact proximity wireless communication in conformity with the ISO/IEC 18092 standard (near field communication (NFC)). However, non-contact proximity wireless communication achieved by the proximity wireless communication unit A112 is not limited to NFC, and another wireless communication standard may be adopted. For example, as the non-contact proximity wireless communication achieved by the proximity wireless communication unit A112, non-contact proximity wireless communication in conformity with the ISO/IEC 14443 standard may be adopted.

A proximity wireless communication non-volatile memory A123 is a non-volatile memory included in the proximity wireless communication unit A112. Data stored inside the proximity wireless communication non-volatile memory A123 is transmitted to and received from a smartphone B100 described below via non-contact proximity wireless communication. When a proximity wireless communication unit B112 described below of the smartphone B100 is brought into the proximity of the proximity wireless communication unit A112, communication starts between the digital camera A100 and the smartphone B100. Note that it is not necessary that the proximity wireless communication unit A112 and the proximity wireless communication unit B112 are brought into physical contact. The proximity wireless communication unit A112 and the proximity wireless communication unit B112 can communicate with each other even with some distance therebetween. Therefore, in order to establish wireless connection between the proximity wireless communication unit A112 and the proximity wireless communication unit B112, it is only necessary to bring these communication units close to each other so as to be within a distance that allows them to perform proximity wireless communication. In the following description, bringing the communication units within the distance that allows them to perform proximity wireless communication may also be referred to as "bringing into proximity". When the proximity wireless communication unit A112 and the proximity wireless communication unit B112 are separated by a distance that does not allow them to perform proximity wireless communication, the communication does not start. In addition, in the situation where the proximity wireless communication unit A112 and the proximity wireless communication unit B112 are located within the distance that allows them to perform proximity wireless communication and the communication is being performed, if these communication units are separated by a distance that does not allow them to perform proximity wireless communication, the communication will be disconnected.

An interruption signal line A124 extended from the proximity wireless communication unit A112 is connected to the first control unit A101 and a second control unit A120. In the case where an interruption signal from the proximity wireless communication unit A112 is output, the proximity wireless communication unit A112 outputs the interruption signal to the interruption signal line A124. As a result, the interruption signal is output to the first control unit A101 and the second control unit A120. In addition, the first control unit A101 and the proximity wireless communication unit A112 are connected via a control signal line A125 for controlling the proximity wireless communication unit A112. By control via the control signal line A125, the first control unit A101 can set the proximity wireless communication unit A112, regarding the timing at which the proximity wireless communication unit A112 outputs the interruption signal via the interruption signal line A124. In addition, by using the control signal line A125, the first control unit A101 can perform reading/writing of data from/to the proximity wireless communication non-volatile memory A123 included in the proximity wireless communication unit A112.

The second control unit A120 is used for controlling a power supply unit A121 according to an operation instruction from the second operation unit A122, and thereby controlling the entire power supply system of the digital camera A100. In particular, the second control unit A120 controls power supply to the first control unit A101. Furthermore, in order to detect communication between the above-described proximity wireless communication unit A112 and proximity wireless communication unit B112, the second control unit A120 receives an interruption signal from the proximity wireless communication unit A112 via the interruption signal line A124.

The second operation unit A122 is used for receiving an instruction to the digital camera A100 from the user. The second operation unit A122 includes, for example, a power button used by the user for making an instruction to power ON or OFF the digital camera A100, a release switch for making an instruction to perform image capturing, and a playback button for making an instruction to playback image data. In addition, the second operation unit A122 includes an operation member such as a connection button dedicated to start communication with an external device via the connection unit A111. Note that the release switch, which is not shown in the drawing, includes SW1 and SW2. SW1 is turned on when the release switch is brought into a so-called half-pressed state. As a result, the second operation unit A122 receives an instruction to perform preparations for still image capturing, such as autofocus (AF) processing, auto exposure (AE) processing, auto white balance (AWB) processing, and pre-flash emission (EF) processing. SW2 is turned on when the release switch is brought into a so-called fully-pressed state. As a result, the second operation unit A122 receives an instruction to perform still image capturing. The above-described first operation unit A105 is an operation unit for a touch panel operation, whereas the second operation unit A122 is an operation unit for one or more button operations using a mechanical mechanism.

The power supply unit A121 is connected to a battery of the digital camera A100, which is not shown in the drawing. When a battery is inserted, the power supply unit A121 first supplies power only to the second control unit A120. Under this condition, the second control unit A120 controls the power supply unit A121 according to an operation from the second operation unit A122, thereby allowing power to be supplied to the first control unit A101 and the peripheral circuitry controlled by the first control unit A101.

Next, a description is given to the smartphone B100. A control unit B101 controls each unit of the smartphone B100 according to an input signal and a program described below. Note that the entire apparatus may be controlled by, instead of the control unit B101, a plurality of pieces of hardware that share the processing.

An image capturing unit B102 includes, for example, an optical lens unit, an optical system that controls the aperture, zooming, focusing, etc., and an image sensor for converting the light (image) guided thereto via the optical lens unit into an electrical image signal. As an example of the image sensor, a CMOS or a CCD is commonly used. Under the control of the control unit B101, the image capturing unit B102 converts an optical image of the subject formed by a lens included in the image capturing unit B102 into an electrical signal by using the image sensor, then performs noise reduction processing, etc., and outputs digital data as image data. The smartphone B100 according to the present embodiment records the image data on a recording medium B110 in conformity with the DCF standard.

A non-volatile memory B103 is an electrically erasable/recordable non-volatile memory, and stores therein a program described below, etc., which is executed by the control unit B101. A work memory B104 is used as a buffer memory for temporarily storing image data captured by the image capturing unit B102, an image display memory for a display unit B106, a work area for the control unit B101, etc.

An operation unit B105 is used for receiving an instruction to the smartphone B100 from the user. The operation unit B105 includes, for example, a power button used by the user for making an instruction to power ON or OFF the smartphone B100, and an operation button for making an instruction to switch from one screen to another. A touch panel formed on the display unit B106 described below is also included in the operation unit B105.

The display unit B106 performs displaying of captured still image data, displaying of graphical user interface (GUI) used for an interactive operation, etc. Note that the display unit B106 is not necessarily included in the smartphone B100. The smartphone B100 is required to have at least a display control function to control the contents to be displayed.

The recording medium B110 can record image data output by the image capturing unit B102. The recording medium B110 may be configured to be attachable to and detachable from the smartphone B100, or embedded in the smartphone B100. In other words, the smartphone B100 is required to have at least the function of accessing the recording medium B110.

A connection unit B111 is an interface used for connecting with an external apparatus. The smartphone B100 according to the present embodiment can exchange data with an external apparatus via the connection unit B111. Note that examples of the connection unit B111 according to the present embodiment include an interface for communication with an external apparatus via a so-called wireless LAN in conformity with the IEEE 802.11 standard. The control unit B101 achieves wireless communication with an external apparatus by controlling the connection unit B111.

A proximity wireless communication unit B112 is located at a side part of the smartphone B100, for example, and includes an antenna for wireless communication, modulation/demodulation circuitry for processing a wireless signal, a communication controller, etc. The proximity wireless communication unit B112 outputs a modulated wireless signal from the antenna, and demodulates wireless signal received from the antenna. Assume that the proximity wireless communication unit B112 according to the present embodiment performs non-contact proximity wireless communication in conformity with the ISO/IEC 18092 standard (near field communication (NFC)). However, non-contact proximity wireless communication achieved by the proximity wireless communication unit B112 is not limited to NFC, and another wireless communication standard may be adopted. For example, as the non-contact proximity wireless communication achieved by the proximity wireless communication unit B112, non-contact proximity wireless communication in conformity with the ISO/IEC 14443 standard may be adopted.

When the proximity wireless communication unit B112 is brought into the proximity of the above-described proximity wireless communication unit A112 of the digital camera A100, communication starts between the digital camera A100 and the smartphone B100. Note that it is not necessary that the proximity wireless communication unit B112 and the proximity wireless communication unit A112 are brought into physical contact. The proximity wireless communication unit B112 and the proximity wireless communication unit A112 can communicate with each other even with a distance therebetween. Therefore, in order to establish wireless connection between the proximity wireless communication unit B112 and the proximity wireless communication unit A112, it is only necessary to bring these communication units close to each other so as to be within a distance that allows them to perform proximity wireless communication. When the proximity wireless communication unit B112 and the proximity wireless communication unit A112 are separated by a distance that does not allow them to perform proximity wireless communication, the communication does not start. In addition, in the situation where the proximity wireless communication unit B112 and the proximity wireless communication unit A112 are located within the distance that allows them to perform proximity wireless communication and communication is being performed, if these communication units are separated by a distance that does not allow them to perform proximity wireless communication, the communication will be disconnected.

A public wireless communication unit B113 is an interface for achieving communication using a public network D100 via a base station C100. The public wireless communication unit B113 includes an antenna for wireless communication, modulation/demodulation circuitry for processing a wireless signal, a communication controller, etc. The public wireless communication unit B113 achieves public wireless communication in conformity with the W-CDMA (UMTS) standard, the long term evolution (LTE) standard, etc.

Although FIG. 1 as an exemplary illustration shows that the digital camera A100 and the smartphone B100 can perform one-to-one communication, one-to-many communication is also available.

Next, with reference to FIG. 2, a description is given to an outline of the operation of a communication system according to the present embodiment. FIG. 2 is a sequence diagram showing a processing flow from when the digital camera A100 operating in a power saving state performs proximity wireless communication with the smartphone B100 to when the digital camera A100 establishes wireless LAN communication. In the following, the same reference signs as in FIG. 1 are used for describing the components of each apparatus. In addition, the dotted arrows used in FIG. 2 express communication via NFC, and the bold arrows used in FIG. 2 express communication via a wireless LAN.

Before the start of the sequence shown in FIG. 2, the digital camera A100 is not performing a shooting operation or preparations for a shooting operation, and it is in a power saving state for waiting for an operation by the user. Specifically, the digital camera A100 is in a state in which only the second control unit A120 is supplied with power, and no power is supplied to the first control unit A101 or peripheral units under the control of the first control unit A101. Similarly, no power is supplied to the proximity wireless communication unit A112 or the proximity wireless communication non-volatile memory A123 included in the proximity wireless communication unit A112. However, even though not being supplied with power from the power supply unit A121, the proximity wireless communication unit A112 and the proximity wireless communication non-volatile memory A123 can operate by generating an electromotive force from the magnetic field generated by the proximity wireless communication unit B112 included in the smartphone B100.

The smartphone B100 is configured to be able to switch between the enabled state and the disabled state for each of the NFC function and the wireless LAN function according to a user operation. Before the start of the sequence shown in FIG. 2, the NFC function is in the "enabled" state and the wireless LAN function is in the "disabled" state. In addition, the smartphone B100 is executing a predetermined application on the control unit B101, the application being for establishing wireless LAN connection with the digital camera A100.

Assume that the sequence in FIG. 2 described below is started when the digital camera A100 and the smartphone B100 are under the above-described conditions. Specifically, when the smartphone B100 that is executing the predetermined application is brought by the user into the proximity of the digital camera A100 that is in the power saving state, the proximity wireless communication unit A112 and the proximity wireless communication unit B112 become able to communicate with each other, and the sequence shown in FIG. 2 starts.

First at step S211, the control unit B101 of the smartphone B100 provides the proximity wireless communication unit B112 with a read request for reading information existing in the proximity wireless communication non-volatile memory A123 of the digital camera A100.

At step S212, via NFC communication, the proximity wireless communication unit B112 provides the proximity wireless communication unit A112 of the digital camera A100 with a read request (Read command). At step S213, in response to the read request made at step S212, the proximity wireless communication unit A112 of the digital camera A100 transmits the information within the proximity wireless communication non-volatile memory A123 to the proximity wireless communication unit B112 of the smartphone B100. The proximity wireless communication unit A112 does not output an interruption signal at this timing.

At step S214, the proximity wireless communication unit B112 of the smartphone B100 provides the control unit B101 with the information received at step S213. At step S215, the control unit B101 temporarily stores the information provided at step S214 into the work memory B104.

Through the processing performed so far, the smartphone B100 has acquired the information from the digital camera A100 by using the proximity wireless communication unit B112. In the present embodiment, the information acquired in such a manner is a wireless parameter. Therefore, the read request made at step S212 serves as a request for acquiring the wireless parameter. The wireless parameter is information (setting information) such as an SSID required for establishing wireless LAN connection and encryption key used in wireless LAN connection. In order to limit devices that connect via wireless LAN connection, the wireless parameter may also include information that can identify an individual device, such as the MAC address of the digital camera A100. Also, in order to shorten the connection time required for establishing the wireless LAN connection with the digital camera A100 described below, the wireless parameter may also include information of the wireless LAN channel to be used.

Next, at step S216, the control unit B101 provides the proximity wireless communication unit B112 with a write request (Write command) for writing information into the proximity wireless communication non-volatile memory A123 of the digital camera A100. The information to be written is information indicating a normal completion of the acquisition of the wireless parameter (hereinafter, this information may also be referred to as "parameter acquisition completion flag", "flag", or "completion information").

At step S217, via NFC communication, the proximity wireless communication unit B112 provides the proximity wireless communication unit A112 of the digital camera A100 with a write request (record request) for writing information into the proximity wireless communication non-volatile memory A123. In response to the write request, the proximity wireless communication unit A112 of the digital camera A100 writes the specified value (i.e., the parameter acquisition completion flag) at the specified address in the proximity wireless communication non-volatile memory A123.

When the write processing to the proximity wireless communication non-volatile memory A123 is normally completed, the proximity wireless communication unit A112, at step S218, provides the second control unit A120 with an interruption signal via the interruption signal line A124. Note that the proximity wireless communication unit A112 is also able to generate an interruption signal in response to the read request from the smartphone B100 (step S212), detection of a change in the magnetic field generated by the proximity wireless communication unit B112 of the smartphone B100, or the like. However, if an interruption signal is generated in response to them, the following problem may occur. That is, the user may move the smartphone B100 away from the digital camera A100 before the smartphone B100 has completely received the response from the digital camera A100, and accordingly the smartphone B100 may become unable to read the necessary information. In this case, since the smartphone B100 has not read the information required for accessing the digital camera A100 via the wireless LAN, the smartphone B100 does not (cannot) make an attempt to access the digital camera A100. It is useless for the digital camera A100 to nevertheless activate the wireless LAN according to the interruption signal. To avoid such a situation, an interruption signal is provided at the timing of the write processing, which is the timing at which at least the smartphone B100 has completed the reading. Note that the above-described interruption signals are basically not distinguished from each other. In other words, when receiving an interruption signal, the second control unit A120 can only detect the occurrence of an event of some sort, and cannot find out the cause (interruption cause) that made the interruption signal to occur. According to the present embodiment, the interruption cause is identified by checking whether the parameter acquisition completion flag has been written or not. This will be described later. In the block diagram shown in FIG. 1, the interruption signal line A124 is connected to the first control unit A101 as well. In this stage, however, the digital camera A100 is in the power saving state in which no power is supplied to the first control unit A101. For this reason, the first control unit A101 cannot detect the interruption signal. The first control unit A101 is the same in that it can use the interruption signal only for the purpose of detecting the timing of the event.

In parallel with the provision of the interruption signal (interruption notification) at step S218, the proximity wireless communication unit A112, at step S219, returns a response indicating the completion of the writing, to the proximity wireless communication unit B112 of the smartphone B100. At step S220, the proximity wireless communication unit B112 of the smartphone B100 notifies the control unit B101 of the completion of the writing of the parameter acquisition completion flag requested at step S216.

Through the processing performed so far, the smartphone B100 has written the parameter acquisition completion flag into the proximity wireless communication non-volatile memory A123 included in the digital camera A100 by using the proximity wireless communication unit B112.

Next, at step S221, the control unit B101 of the smartphone B100 enables the connection unit B111 by using the wireless parameter acquired at step S215. In other words, the control unit B101 performs processing for starting wireless LAN communication. At step S222, the connection unit B111 searches for the other party of the wireless LAN communication. Specifically, the connection unit B111 continues the search until the connection unit A111 of the digital camera A100 is started up and the SSID acquired at step S215 is detected by the wireless LAN communication.

Meanwhile, the second control unit A120 of the digital camera A100 starts power supply to the first control unit A101 at step S223 in response to the interruption signal received at step S218. The second control unit A120 also starts power supply to the proximity wireless communication unit A112 at step S224.

Before step S224, the digital camera A100 was not supplying power from the inside of the digital camera A100 to the proximity wireless communication unit A112. The proximity wireless communication unit A112 was obtaining power required for the operation thereof by generating an electromotive force from the magnetic field generated by the proximity wireless communication unit B112 of the smartphone B100. On the other hand, from step S224, the proximity wireless communication unit A112 can obtain power from the inside of the digital camera A100. In other words, the proximity wireless communication unit A112 according to the present embodiment starts being supplied with power from the digital camera A100 at the same timing as the power supply to the first control unit A101 is started.

As a result, the control signal line A125 between the first control unit A101 and the proximity wireless communication unit A112 is enabled, and the proximity wireless communication unit A112 becomes able to receive a control instruction from the first control unit A101. As a result, the first control unit A101 becomes able to identify the interruption cause, which made the interruption signal delivered via the interruption signal line A124 to occur, by referring to the register information within the proximity wireless communication unit A112 by using the control signal line A125. Similarly, the first control unit A101 becomes able to clear the information of the interruption cause by using the control signal line A125.

As described above, the digital camera A100 maintains the power saving state until the smartphone B100 normally completes the processing of reading the wireless parameter stored in the proximity wireless communication non-volatile memory A123 by using NFC communication. Maintaining the power saving state for long time as described above leads to the effect of reducing unnecessary power consumption by the digital camera A100 powered by a battery.

Here, note that the interruption cause is, as described above, identified by checking whether the parameter acquisition completion flag has been written or not. The following describes this point.

The proximity wireless communication unit A112 typically can hold information of the interruption cause in the register (not shown in the drawings) within the proximity wireless communication unit A112. In other words, the first control unit A101 can identify the interruption cause by referring to the register information in the proximity wireless communication unit A112 after the activation. However, if the smartphone B100 is moved away before power supply to the proximity wireless communication unit A112 from the digital camera A100 is started, the register information will be cleared due to the interruption of power supply. As described above, power supply to the proximity wireless communication unit A112 and power supply to the first control unit A101 start with substantially the same timing. Therefore, at the timing when the first control unit A101 refers to the register information (i.e., timing after the start of power supply), there is the possibility that the information in the register has already been cleared and the first control unit A101 cannot refer to the information. If this is the case, the first control unit A101 cannot identify the cause of the occurrence of the interruption signal, and cannot determine whether to activate the wireless LAN.

This problem can be mitigated by using the parameter acquisition completion flag, which is written at step S217. The following describes in further details the cause of this problem and the reason why this problem can be mitigated.

As shown in the block diagram of FIG. 1, the digital camera A100 according to the present embodiment is configured such that the second control unit A120 is connected to the proximity wireless communication unit A112 only via the interruption signal line A124. In other words, although the second control unit A120 has the function of detecting the interruption signal provided from the proximity wireless communication unit A112 via the interruption signal line A124, the second control unit A120 does not have the function of checking with the proximity wireless communication unit A112 and identifying the interruption cause. The second control unit A120 does not have the function of clearing the interruption signal delivered via the interruption signal line A124, either. Therefore, when detecting the interruption signal delivered via the interruption signal line A124, the second control unit A120 performs only the processing for supplying power to the first control unit A101 and the proximity wireless communication unit A112.

After that, the first control unit A101 supplied with power checks the information of the interruption cause in the proximity wireless communication unit A112 by using the control signal line A125, and performs an operation for clearing the interruption signal delivered via the interruption signal line A124.

However, at the timing when the interruption signal delivered via the interruption signal line A124 occurs, the proximity wireless communication unit A112 is driven by power supplied from the smartphone B100. After that, power supply to the proximity wireless communication unit A112 is started under the control of the second control unit A120 that has detected the interruption signal. Therefore, if the smartphone B100 is moved away from the digital camera A100 before power supply to the proximity wireless communication unit A112 is started under the control of the second control unit A120, power supply for driving the proximity wireless communication unit A112 will be interrupted. As a result, the interruption signal generated by the proximity wireless communication unit A112 will be cleared, and furthermore, the information of the interruption cause held by the proximity wireless communication unit A112 will be possibly cleared.

To solve this problem, the smartphone B100 according to the present embodiment writes, into the proximity wireless communication non-volatile memory A123, the information (the parameter acquisition completion flag) indicating that the wireless parameter has normally been read from the proximity wireless communication non-volatile memory A123. The data written into the proximity wireless communication non-volatile memory A123 is maintained even when the power supply to the proximity wireless communication unit A112 is interrupted. In other words, the parameter acquisition completion flag can be used as a substitute for the information of the interruption cause that can be useless (i.e., can be cleared) depending on the timing.

In addition, by using the parameter acquisition completion flag, the digital camera A100 can determine whether the smartphone B100 is making a request for wireless LAN connection or not, and can determine whether to activate a wireless LAN. Specifically, applications that can be installed in the smartphone B100 include, in addition to a predetermined application for establishing wireless LAN connection, an application that can rewrite the contents of the NFC tag. By using such an application, the smartphone B100 can transmit a write request to the proximity wireless communication unit A112 of the digital camera A100. When such a write request occurs, the proximity wireless communication unit A112 provides an interruption notification to the second control unit A120 via the interruption signal line A124 (See step S218 in FIG. 2). However, it is useless for the first control unit A101 to activate a wireless LAN and wait for an access in such a case. This is because the application that made the write request is not an application for establishing wireless LAN connection and accordingly there is no possibility that the smartphone B100 will access the digital camera A100 via the wireless LAN. To avoid such a situation, the first control unit A101 checks the details of the flag written in the proximity wireless communication non-volatile memory A123. In other words, the first control unit A101 checks whether a predetermined value has been written at a predetermined address. By this operation, the first control unit A101 can determine whether the application that is the root cause of the interruption notification made at step S218 is an application for establishing wireless LAN connection or not. In other words, the first control unit A101 activates a wireless LAN only when the writing at step S217 is performed by an entity that accesses the digital camera A100 via a wireless LAN. This operation makes it possible to avoid uselessly activating a wireless LAN.

Referring to steps from step S225 in FIG. 2, the following describes the processing of using the parameter acquisition completion flag. At step S225, the first control unit A101 performs activation processing. This activation processing includes, for example, initialization of the shooting functions of the digital camera A100, such as initialization of the operating system (OS) and initialization of peripheral devices.

Upon completion of the activation processing, the first control unit A101, at step S226, makes a read request to the proximity wireless communication non-volatile memory A123 included in the NFC tag (proximity wireless communication unit A112). At step S227, in response to the read request, the proximity wireless communication unit A112 acquires information having a predetermined size from a predetermined address, and returns the information to the first control unit A101. The communication between the first control unit A101 and the proximity wireless communication unit A112 at steps S226 and S227 is performed by using the control signal line A125.

At step S228, the first control unit A101 temporarily stores the information acquired at step S227 into the work memory A104. Then, the first control unit A101 detects the parameter acquisition completion flag from the information temporarily stored.

Upon detection of the parameter acquisition completion flag, the first control unit A101, at step S229, activates the connection unit A111 by using the same parameter as the wireless parameter acquired by the smartphone B100. The wireless parameter used here may be a fixed value held in the non-volatile memory A103, or data generated at random every time in consideration of the security. In the case of random generation, the first control unit A101 holds the generated data in the proximity wireless communication non-volatile memory A123, and reads and uses the wireless parameter from the proximity wireless communication non-volatile memory A123 after the activation. Note that, although not shown in the drawings, the first control unit A101 does not activate the connection unit A111 when the parameter acquisition completion flag is not detected.

Through the processing performed so far, the digital camera A100 has determined whether or not to activate the connection unit A111 according to the parameter acquisition completion flag written in the proximity wireless communication non-volatile memory A123 by the smartphone B100.

After the connection unit A111 is started up, the smartphone B100 that is searching for a wireless LAN device (See step S222) can detect the digital camera A100 via wireless LAN communication. As a result, at step S230, the digital camera A100 and the smartphone B100 establish wireless LAN connection. After establishing the connection, at step S231, the digital camera A100 and the smartphone B100 perform wireless LAN communication.

Figure 3A:
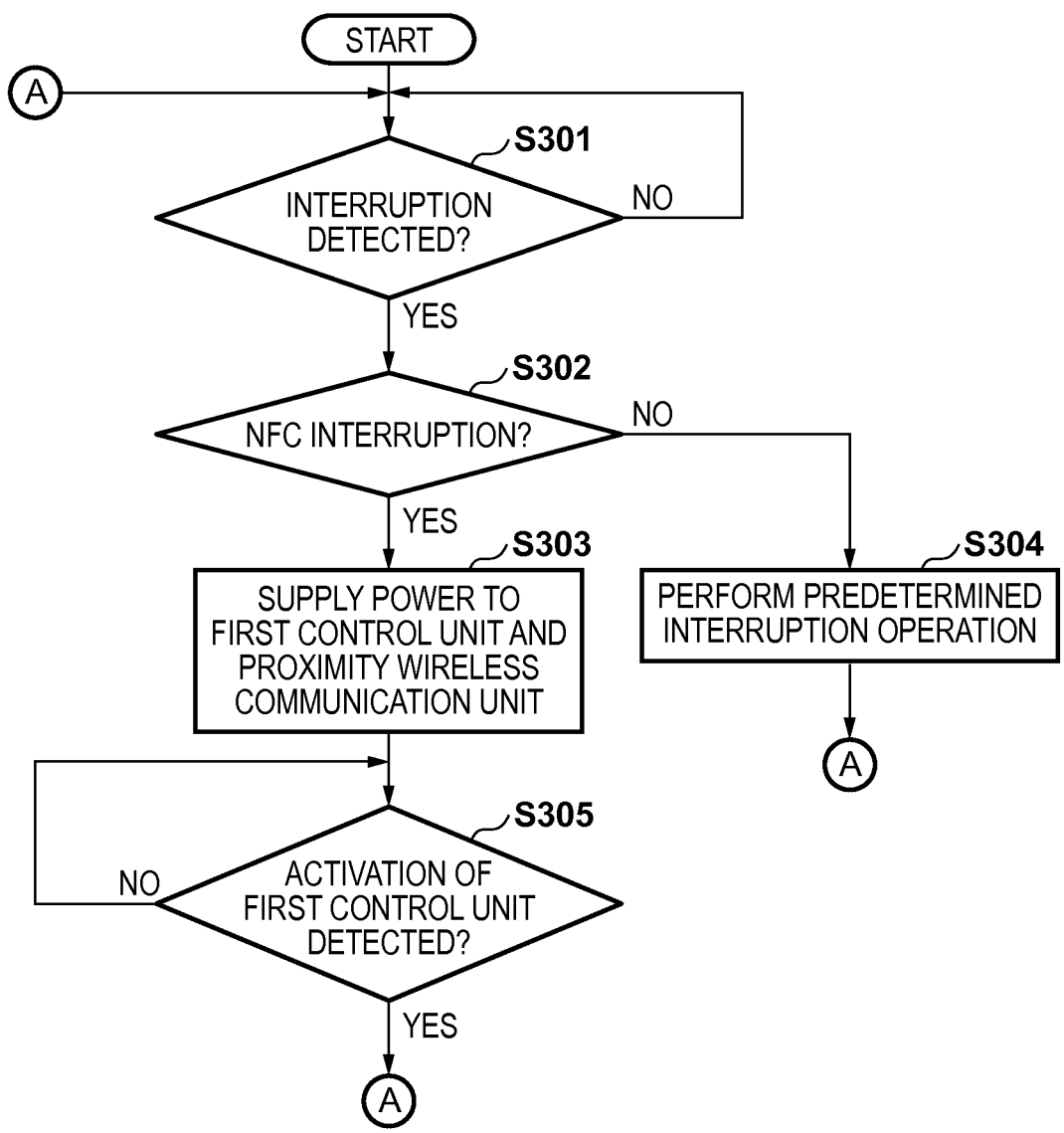
FIG. 3A is a flowchart showing processing performed by a second control unit A120 of the digital camera A100.
Figure 3B:
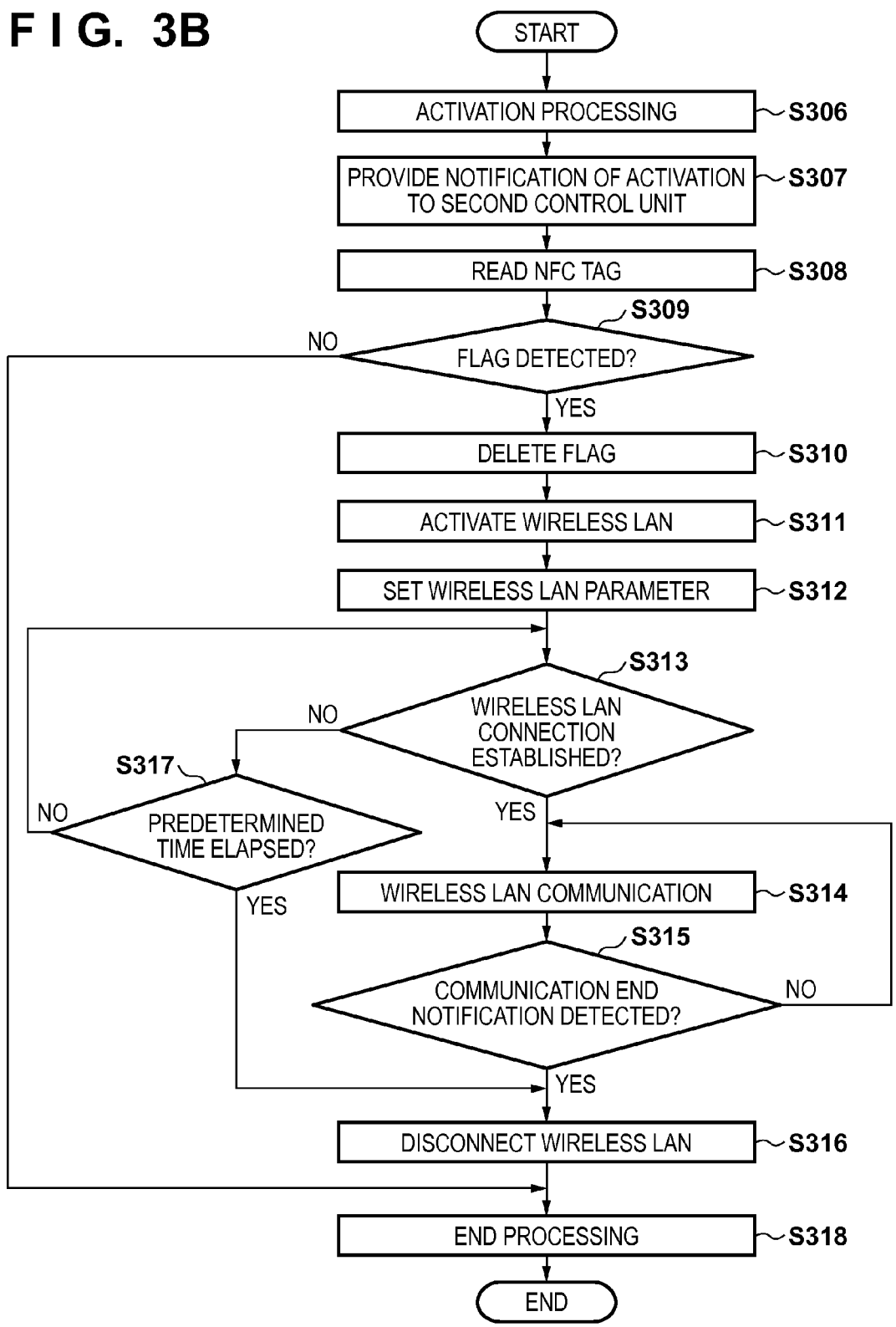
FIG. 3B is a flowchart showing processing performed by a first control unit A101 of the digital camera A100.
Figure 4:
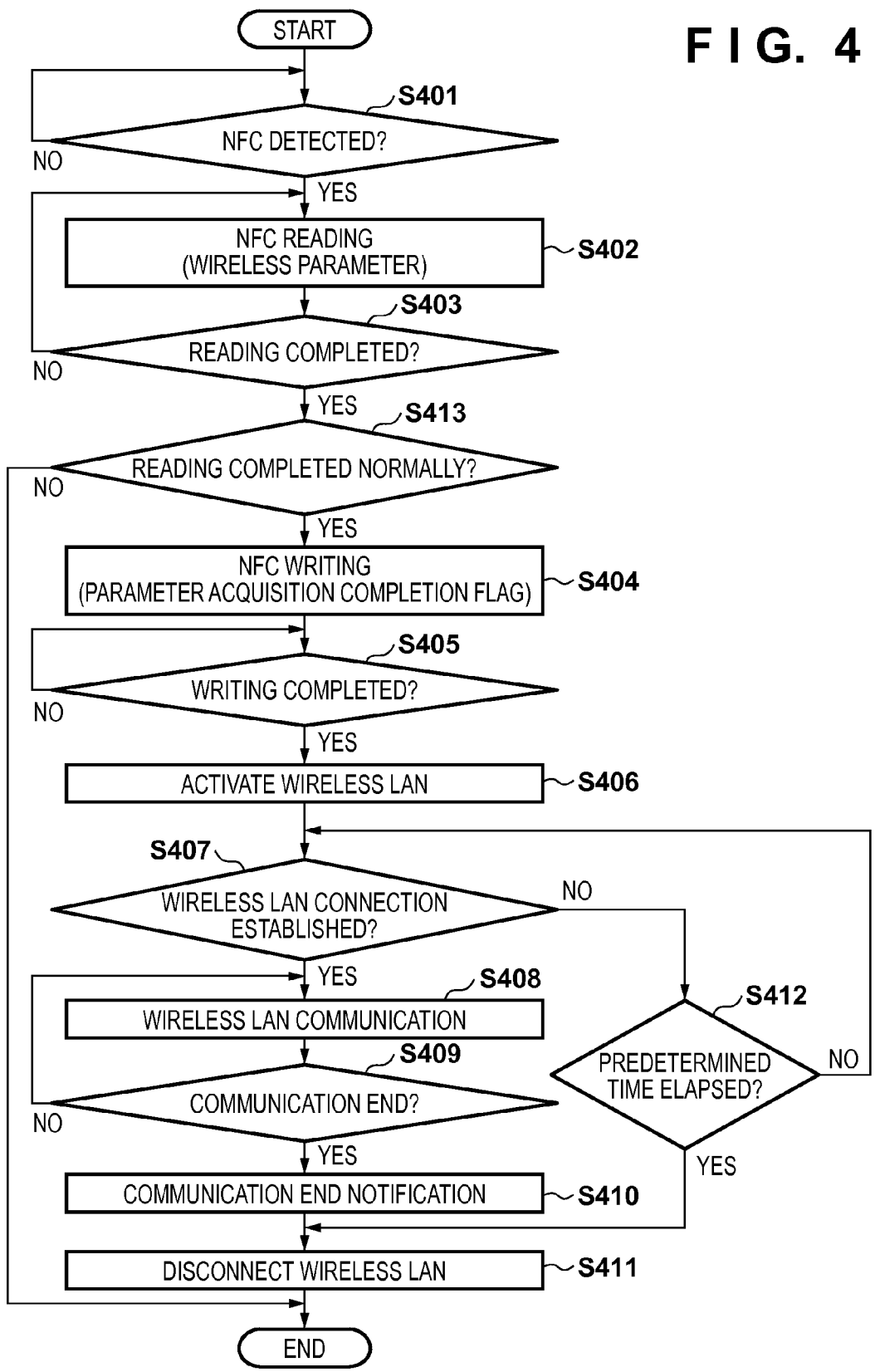
FIG. 4 is a flowchart showing processing performed by a control unit B101 of the smartphone B100.

Next, with reference to FIG. 3A, FIG. 3B, and FIG. 4, a detailed description is given to the processing performed by the digital camera A100 and the processing performed by the smartphone B100. FIG. 3A is a flowchart showing the processing performed by the second control unit A120 of the digital camera A100. FIG. 3B is a flowchart showing the processing performed by the first control unit A101 of the digital camera A100. Note that the processing shown in these flowcharts is realized by the first control unit A101 and the second control unit A120 of the digital camera A100, controlling each unit of the digital camera A100 according to an input signal and a program.

At the beginning, the digital camera A100 is in the power saving state and no power is supplied to the first control unit A101. Therefore, the first control unit A101 is not operating, whereas the second control unit A120 is operating.

At step S301, the second control unit A120 is waiting for an interruption notification from the second operation unit A122 or the proximity wireless communication unit A112. When the second control unit A120 detects an interruption notification, the processing moves to step S302.

At step S302, the second control unit A120 determines whether the interruption notification detected at step S301 is provided by the proximity wireless communication unit A112 or not. For example, the second control unit A120 is configured to have a plurality of interruption detection ports each corresponding to a different external device that can be the cause of the interruption notification, and this configuration allows for the determination at step S302. When the second control unit A120 determines that the interruption notification is provided by the proximity wireless communication unit A112, the processing moves to step S303, and otherwise the processing moves to step S304. It is assumed in the following that the processing has moved to step S303, and the processing performed at S304 will be described later.

At step S303, the second control unit A120 supplies power to the first control unit A101 and the proximity wireless communication unit A112 by controlling the power supply unit A121. The power supply unit A121 of the digital camera A100 is made up from power supply ICs that generate DC power, such as a regulator and a DC-DC converter. Therefore, the second control unit A120 can start power supply to the first control unit A101 and the proximity wireless communication unit A112 by inputting a control signal for powering on or off to the power supply ICs constituting the power supply unit A121.

After the processing at step S303, the second control unit A120, at step S305, waits until it detects that the first control unit A101 has normally been started up. When the second control unit A120 detects the activation of the first control unit A101, the processing returns to step S301.

Meanwhile, when power supply is started at step S303 in FIG. 3A, the first control unit A101 of the digital camera A100 performs activation processing at step S306 in FIG. 3B. Specifically, the first control unit A101 performs initialization of the operating system (OS), initialization of peripheral devices connected to the first control unit A101, etc.

Upon completion of the activation processing, at step S307, the first control unit A101 notifies the second control unit A120 of the completion of the activation. As a result, the second control unit A120 becomes able to detect the activation of the first control unit A101 at step S305 in FIG. 3A. Although the detection at step S305 can be realized by, for example, the second control unit A120 detecting the state of the terminal of the first control unit A101, or the second control unit A120 communicating with the first control unit A101, the detection is not necessarily performed in this way. In other words, the present embodiment can be implemented as long as it is configured such that step S305 in FIG. 3A and step S306 in FIG. 3B are brought into synchronization.

After the processing returns from step S305 to step S301 in FIG. 3A, and when the second control unit A120 detects the interruption notification from the second operation unit A122, the processing moves to step S304 via step S302. At step S304, the second control unit A120 performs a predetermined operation corresponding to the device of the second operation unit A122 that is the cause of the interruption notification. The predetermined operation mentioned above is an operation of some sort that corresponds to a release operation, a button operation, etc.

Meanwhile, at step S308, the first control unit A101 reads information from the proximity wireless communication non-volatile memory A123. At step S309, the first control unit A101 determines whether the parameter acquisition completion flag has been written in a predetermined address space of the information thus read.

Note that the first control unit A101 may identify the interruption cause by referring to the register information within the proximity wireless communication unit A112 in addition to detecting the parameter acquisition completion flag. However, the register information can be useless because there is the possibility that the information of the interruption cause is already cleared as described above.

When the first control unit A101 detects the parameter acquisition completion flag at step S309, the processing moves to step S310. On the other hand, when the parameter acquisition completion flag is not detected, the processing moves to step S318 and the first control unit A101 performs end processing. Thus, the useless activation of a wireless LAN can be avoided.

At step S310, the first control unit A101 deletes the parameter acquisition completion flag from the proximity wireless communication non-volatile memory A123. At step S311, the first control unit A101 supplies power to the connection unit A111, and activates the connection unit A111. At step S312, the first control unit A101 sets the wireless parameter stored in the proximity wireless communication unit A112 to be an argument for the wireless LAN driver. This wireless parameter is the same as the parameter acquired by the smartphone B100 via NFC communication, and includes SSID required for establishing wireless LAN connection, an encryption key, etc. Once the wireless parameter is set, the digital camera A100 can transmit Beacon information including SSID information by using the connection unit A111.

At step S313, the first control unit A101 determines whether a wireless LAN connection with the smartphone B100 has been established or not. Since the smartphone B100 has acquired via NFC communication the same wireless parameter as the digital camera A100, it is likely that the wireless LAN connection will be normally established. However, there is the possibility that the wireless LAN connection is not established because of low remaining battery level of the smartphone B100 even though the NFC communication was successful. When the wireless LAN connection is not established, the first control unit A101 determines at step S317 whether a predetermined period has elapsed or not. When the first control unit A101 determines that the predetermined period has not elapsed, the processing returns to step S313. In the case where the wireless LAN connection is not established when the predetermined period has elapsed, the first control unit A101 determines that the smartphone B100 temporarily cannot activate a wireless LAN, and terminates the wireless LAN operation at step S316.

When the wireless LAN connection is established at step S313, the first control unit A101, at step S314, starts wireless LAN communication with the smartphone B100. Assume that the communication mode applied to this wireless LAN communication is determined according to the operation mode of the digital camera A100 determined by the smartphone B100. When the wireless LAN communication is started at step S314, the smartphone B100 notifies the digital camera A100 of the operation mode. For example, the following provides a description of the case where the smartphone B100 is operating in the mode of acquiring captured images within the digital camera A100. Upon receipt of a notification from the smartphone B100 indicating that the smartphone B100 is operating in the captured image acquisition mode, the first control unit A101 transfers thumbnail images stored in the recording medium A110 to the smartphone B100 via the wireless LAN. The smartphone B100 displays the acquired thumbnail images on the display unit B106. The user of the smartphone B100 selects, from among the thumbnail images displayed by the display unit B106, an image that the user wishes to download to the smartphone B100. The first control unit A101, via the wireless LAN, identifies the image selected on the smartphone B100, expands, on the work memory A104, the corresponding captured image acquired from the recording medium A110, and transfers the image to the smartphone B100.

In parallel with the wireless LAN communication performed at step S314, the first control unit A101, at step S315, makes a determination as to whether a wireless LAN communication end notification from the smartphone B100 has been detected or not. Note that the wireless LAN communication end notification mentioned above is a notification that is used for terminating the wireless LAN communication and is transmitted from the smartphone B100 when the smartphone B100 terminates the application that controls the digital camera A100.

When the first control unit A101 detects the wireless LAN communication end notification at step S315, the processing moves to step S316. At step S316, the first control unit A101 disconnects the wireless LAN. At step S318, the first control unit A101 performs end processing for the first control unit A101. The end processing mentioned above includes end processing for the peripheral devices under the control of the first control unit A101. In other words, the end processing includes processing for putting the first control unit A101 and the peripheral devices into the state in which they can be powered off at any time.

Here, note that a description given above is based on the assumption that the interruption notification at step S218 in FIG. 2 and step S301 in FIG. 3A, which is detected by the second control unit A120, occurs when the smartphone B100 completes the writing of the flag into the proximity wireless communication non-volatile memory A123. However, the interruption notification may be generated before the writing of the flag, i.e., at the timing of the receipt of the request for the writing of the flag. Alternatively, the interruption notification may be generated when the smartphone B100 makes a read request for reading the wireless parameter in the proximity wireless communication non-volatile memory A123. That is, the interruption notification may be generated at a timing different from the timing described above. In such a case, the first control unit A101 repeats the processing at step S308 and step S309 until the parameter acquisition completion flag is detected or a timeout occurs. By this operation, the first control unit A101 can activate the wireless LAN after detecting the parameter acquisition completion flag, regardless of the timing of the occurrence of the interruption notification. In other words, the proximity wireless communication unit A112 makes the interruption notification when predetermined communication is performed, and examples of the predetermined communication include the reception of the read request made at step S212 and the reception of the write request made at step S217. However, as described above, in the case where the interruption notification occurs at the writing of the flag (at the reception of the write request), the first control unit A101 is started up later than in other cases, and accordingly the power consumption is smaller.

Next, a description is given to the operation of the smartphone B100. FIG. 4 is a flowchart showing the processing performed by the control unit B101 of the smartphone B100. The processing shown by this flowchart is realized by the control unit B101 of the smartphone B100, controlling each unit of the smartphone B100 according to an input signal and a program.

At the beginning, the smartphone B100 is executing a predetermined application on the control unit B101, the application being for establishing wireless LAN connection with the digital camera A100. In addition, the NFC function is in the "enabled" state, and the wireless LAN function is in the "disabled" state.

At step S401, the control unit B101 of the smartphone B100 determines whether the proximity wireless communication unit A112 has been detected or not. When the user brings the smartphone B100 into the proximity of the digital camera A100, the control unit B101 detects a detection signal from the proximity wireless communication unit B112 to the proximity wireless communication unit A112. Therefore, the determination at step S401 is made by determining whether the control unit B101 has detected the detection signal or not. When the control unit B101 detects the detection signal, the processing moves to step S402.

At step S402, the control unit B101 performs an operation for reading information from the proximity wireless communication non-volatile memory A123 via the proximity wireless communication unit A112 of the digital camera A100. The information read in this stage is a wireless parameter including the SSID required for establishing wireless LAN connection, an encryption key, etc.

At step S403, the control unit B101 determines whether it has completed the reading of the wireless parameter from the proximity wireless communication non-volatile memory A123 of the digital camera A100. This determination is made based on a response from the proximity wireless communication unit A112 of the digital camera A100. The control unit B101 continues the operation for reading at step S402 until completion of the reading. Upon completion of the reading, the control unit B101 temporarily stores the information read from the proximity wireless communication non-volatile memory A123 into the work memory B104. After that, the processing moves to step S413.

At step S413, the control unit B101 determines whether the information read from the proximity wireless communication non-volatile memory A123 is normal or not. For example, a CRC code has been added to the information (data) read via NFC communication, and the control unit B101 can determine whether the read information includes a bit error or not, based on the CRC code. When the control unit B101 determines that the information read from the proximity wireless communication non-volatile memory A123 is not normal, the processing shown in this flowchart ends. Otherwise, the processing moves to step S404.

At step S404, the control unit B101 writes the parameter acquisition completion flag into the proximity wireless communication non-volatile memory A123 of the digital camera A100 by using the proximity wireless communication unit B112. The proximity wireless communication unit A112 of the digital camera A100 provides the interruption notification to the second control unit A120 in response to the write request from the proximity wireless communication unit B112 (See step S301 in FIG. 3A).

At step S405, the control unit B101 waits until the completion of the writing of the parameter acquisition completion flag. Upon completion of the writing, the control unit B101 activates a wireless LAN at step S406. The wireless parameter used in this stage is the wireless parameter read from the proximity wireless communication non-volatile memory A123 at step S402 and temporarily stored in the work memory B104.

At step S407, the control unit B101 determines whether wireless LAN connection with the digital camera A100 has been established or not. Since the smartphone B100 has acquired via NFC communication the same wireless parameter as the digital camera A100, it is likely that the wireless LAN connection will be normally established. However, there is the possibility that the digital camera A100 does not activate a wireless LAN, for example for the reason that during the writing of the parameter acquisition completion flag at step S404, the data has been altered and contains an error due to a communication failure. When the wireless LAN connection is not established, the control unit B101 determines at step S412 whether a predetermined period has elapsed or not. When the control unit B101 determines that the predetermined period has not elapsed, the processing returns to step S407. In the case where the wireless LAN connection is not established when the predetermined period has elapsed, the control unit B101 determines that the digital camera A100 temporarily cannot activate a wireless LAN, and terminates the wireless LAN operation at step S411.

When the wireless LAN connection is established at step S407, the control unit B101, at step S408, starts wireless LAN communication with the digital camera A100. According to the present embodiment, as described for FIG. 3B, the smartphone B100 notifies the digital camera A100 of the operation mode at the beginning of the wireless LAN communication performed at step S408.

Note that, at step S404, via NFC communication, the control unit B101 may provide the digital camera A100 with information of the operation mode together with the parameter acquisition completion flag. For example, assume that at step S404 the control unit B101 provides the digital camera A100 with information of the operation mode indicating "a remote shooting operation mode via a wireless LAN". In this case, the proximity wireless communication unit A112 of the digital camera A100 records the information indicating the operation mode (operation mode information) into the proximity wireless communication non-volatile memory A123 in addition to the parameter acquisition completion flag (See step S217 in FIG. 2). By this operation, when starting the wireless LAN communication at step S314 in FIG. 3B, the first control unit A101 of the digital camera A100 can detect the operation mode information recorded in the proximity wireless communication non-volatile memory A123, and automatically switch to the live-view shooting mode. As a result, at the beginning of the communication performed at step S314 described with respect to FIG. 3B, the processing by which the smartphone B100 notifies the digital camera A100 of the operation mode via the wireless LAN can be omitted. For the user, it is possible to smoothly start the shooting operation, because the digital camera A100 is already waiting in the desired operation mode at the completion of the wireless LAN connection.

At step S409, the control unit B101 determines whether to end the wireless LAN communication or not. The control unit B101 continues the wireless LAN communication at step S408 until it determines to end the wireless LAN communication. When ending the wireless LAN communication, the control unit B101, at step S410, transmits the wireless LAN communication end notification to the digital camera A100. For example, when an operation for ending the application is selected on the operation unit B105 by the user, the control unit B101 determines to end the wireless LAN communication.

At step S411, the control unit B101 disconnects the wireless LAN. By this operation, both the digital camera A100 and the smartphone B100 can normally end the wireless LAN communication.

In the above description of the present embodiment, the connection unit A111 and the connection unit B111 perform wireless LAN communication. However, the present embodiment can be implemented even when the wireless LAN communication is replaced with the IEEE 802.15 standard (so-called Bluetooth (registered trademark)). If this is the case, the parameter exchanged in the proximity wireless communication via the proximity wireless communication unit A112 and the proximity wireless communication unit B112 is replaced with a parameter for Bluetooth (registered trademark).

According to the present embodiment, the smartphone B100 writes the parameter acquisition completion flag into the proximity wireless communication non-volatile memory A123 when the smartphone B100 can normally read the wireless parameter stored in the proximity wireless communication non-volatile memory A123 of the digital camera A100. The digital camera A100 recovers from the power saving state when detecting the interruption notification generated at the writing of the parameter acquisition completion flag. In other words, the digital camera A100 does not recover from the power saving state until the smartphone B100 normally completes the reading of the wireless parameter. This operation leads to the effect of reducing unnecessary power consumption by the digital camera A100 powered by a battery.

The procedure of exchanging the wireless parameter described in the present embodiment above is achieved by short range communication represented by NFC. Therefore, the success rate of communication depends on the physical distance between devices. For this reason, the digital camera A100 also performs an operation for determining whether the parameter acquisition completion flag that is considered as having been written by the smartphone B100 has a normal value or not. When the digital camera A100 cannot detect a normal flag, the digital camera A100 can immediately switch to the power saving state without starting up a wireless LAN. In this way, by performing the processing for detecting a normal flag, the digital camera A100 can avoid unnecessarily activating a wireless LAN. That is, this operation also leads to the effect of reducing unnecessary power consumption by the digital camera A100 powered by a battery.

As described above, according to the first embodiment, the smartphone B100 writes the parameter acquisition completion flag into the proximity wireless communication non-volatile memory A123 upon acquisition of the wireless parameter from the digital camera A100 via NFC. The digital camera A100 recovers from the power saving state to the normal state according to the interruption notification provided in response to the writing of the parameter acquisition completion flag for example, and detects the parameter acquisition completion flag. Thus, when recovering from the power saving state to the normal state, the digital camera A100 can find out the cause of the recovering to the normal state, and can activate a wireless LAN only when necessary.

Other Embodiments

Note that the embodiment above is described based on the assumption that the interruption notification from the proximity wireless communication unit A112 cannot express the details of the event (Read or Write). However, when the interruption notification from the proximity wireless communication unit A112 can also express the details of the event, the timing of starting the power supply to the first control unit A101 may be controlled by a means other than the interruption notification from the proximity wireless communication unit A112. In other words, the second control unit A120 which has received the interruption notification including the details of the event may determine whether to supply power to the first control unit A101. In this case, the second control unit A120 does not supply power to the first control unit A101 when receiving the interruption notification indicating the Read event from the proximity wireless communication unit A112, and the second control unit A120 supplies power to the first control unit A101 when receiving the interruption notification indicating the Write event.

In addition, in the above-described embodiment, the processing for determining whether or not to provide the interruption notification from the proximity wireless communication unit A112 based on whether the request from the external apparatus is Read or Write is performed in the same manner even when the state is not the power saving state. In other words, when receiving a Read request, the proximity wireless communication unit A112 does not provide the interruption notification in the same manner, even if the first control unit A101 is being supplied with power. This operation lowers the possibility of the useless activation of a wireless LAN.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-121848, filed Jun. 12, 2014, which is hereby incorporated by reference herein in its entirety.

What is claimed is:

1. A communication apparatus comprising:
a proximity communication unit configured to communicate with an external apparatus by proximity wireless communication, the proximity communication unit is connected to a memory; and
a control unit configured to control an operation of the communication apparatus; and
a second communication unit configured to communicate with the external apparatus, the second communication unit having a longer communication range than the proximity wireless communication,
wherein the control unit controls communication with the external apparatus via the second communication unit,
wherein the proximity communication unit transmits first data recorded in the memory to the external apparatus in response to receiving a read request from the external apparatus,
wherein the proximity communication unit records second data received from the external apparatus in the memory in response to receiving a write request from the external apparatus, and
wherein the proximity communication unit provides a notification to the control unit and the control unit is activated in response to receiving the write request from the external apparatus via the proximity wireless communication regardless of content of the second data, and the proximity communication unit does not provide a notification to the control unit and the control unit is not activated in response to receiving the read request from the external apparatus via the proximity wireless communication.

2. The communication apparatus according to claim 1, further comprising a power supply control unit configured to control power supply to units included in the communication apparatus,
wherein the proximity communication unit provides a notification to the power supply control unit in response to receiving the write request from the external apparatus via the proximity wireless communication, and the proximity communication unit does not provide a notification to the power supply control unit in response to receiving the read request from the external apparatus via the proximity wireless communication.

3. The communication apparatus according to claim 2, wherein
the communication apparatus has a plurality of states including a first state, and a second state in which the communication apparatus consumes a smaller amount of power than in the first state, and
the communication apparatus switches to the first state in response to the power supply control unit receiving the notification from the proximity communication unit.

4. The communication apparatus according to claim 1, wherein
the communication apparatus has a plurality of states including a first state, and a second state in which the communication apparatus consumes a smaller amount of power than in the first state,
the communication apparatus switches to the first state in response to the proximity communication unit receiving the write request from the external apparatus, and
the communication apparatus does not switch to the first state in response to the proximity communication unit receiving the read request from the external apparatus.

5. The communication apparatus according to claim 1, wherein the control unit starts controlling the communication via the second communication unit in response to the proximity communication unit receiving the write request from the external apparatus, and the control unit does not start controlling the communication via the second communication unit in response to the proximity communication unit receiving the read request from the external apparatus.

6. The communication apparatus according to claim 1, wherein the control unit activates the second communication unit in response to the proximity communication unit receiving the write request from the external apparatus, and the control unit does not activate the second communication unit in response to the proximity communication unit receiving the read request from the external apparatus.

7. The communication apparatus according to claim 5, wherein the communication performed by the second communication unit is established by using a communication parameter shared with the external apparatus via the proximity wireless communication.

8. The communication apparatus according to claim 5, wherein the communication performed by the second communication unit is established by using a communication parameter shared with the external apparatus by means of the read request via the proximity wireless communication.

9. The communication apparatus according to claim 7, wherein the second communication unit generates a network by using a communication parameter shared with the external apparatus via the proximity wireless communication, and establishes the communication with the external apparatus via the network.

10. The communication apparatus according to claim 5, wherein the second communication unit disconnects the communication established by the second communication unit in response to receiving a disconnection instruction from the external apparatus via the communication established by the second communication unit.

11. The communication apparatus according to claim 5, further comprising an image capturing unit configured to generate image data by capturing an image of a subject, wherein
the second communication unit transmits the image data to the external apparatus, and
the proximity communication unit does not transmit the image data to the external apparatus.

12. The communication apparatus according to claim 5, wherein the proximity wireless communication is NFC communication, and the communication performed by the second communication unit is WLAN communication.

13. The communication apparatus according to claim 1, wherein the control unit reads the second data from the memory of the proximity communication unit in response to receiving the notification.

14. The communication apparatus according to claim 13, wherein the control unit deletes the second data from the memory of the proximity communication unit in response to completion of reading of the second data.

15. A communication apparatus comprising:
a proximity communication unit configured to communicate with an external apparatus by proximity wireless communication, the proximity communication unit has a memory;
a control unit configured to control an operation of the communication apparatus; and
a second communication unit configured to communicate with the external apparatus, the second communication unit having a longer communication range than the proximity wireless communication,
wherein the control unit controls communication with the external apparatus via the second communication unit,
wherein the proximity communication unit transmits first data recorded in the memory to the external apparatus in response to receiving a read request from the external apparatus,
wherein the proximity communication unit records second data received from the external apparatus in the memory in response to receiving a write request from the external apparatus,
wherein the communication apparatus has a plurality of states including a first state in which the control unit is active, and a second state in which the control unit is not active and the communication apparatus consumes a smaller amount of power than in the first state,
wherein the communication apparatus switches to the first state in response to the proximity communication unit receiving the write request from the external apparatus regardless of content of the second data, and
wherein the communication apparatus does not switch to the first state in response to the proximity communication unit receiving the read request from the external apparatus.

16. The communication apparatus according to claim 15, wherein the control unit activates the second communication unit in response to the proximity communication unit receiving the write request from the external apparatus, and the control unit does not activate the second communication unit in response to the proximity communication unit receiving the read request from the external apparatus.

17. The communication apparatus according to claim 16, wherein the communication performed by the second communication unit is established by using a communication parameter shared with the external apparatus via the proximity wireless communication.

18. The communication apparatus according to claim 16, further comprising an image capturing unit configured to generate image data by capturing an image of a subject, wherein
the second communication unit transmits the image data to the external apparatus, and
the proximity communication unit does not transmit the image data to the external apparatus.

19. A method for controlling a communication apparatus, the communication apparatus comprising:
a proximity communication unit configured to communicate with an external apparatus by proximity wireless communication, the proximity communication unit has a memory;
a control unit configured to control an operation of the communication apparatus; and
a second communication unit configured to communicate with the external apparatus, the second communication unit having a longer communication range than the proximity wireless communication,
wherein the control unit controls communication with the external apparatus via the second communication unit,
wherein the proximity communication unit transmits first data recorded in the memory to the external apparatus in response to receiving a read request from the external apparatus, and
wherein the proximity communication unit records second data received from the external apparatus in the memory in response to receiving a write request from the external apparatus,
the method comprising
in response to receiving the write request from the external apparatus via the proximity wireless communication regardless of content of the second data, providing, by the proximity communication unit, a notification to the control unit, wherein the control unit is activated,
wherein the proximity communication unit does not provide a notification to the control unit and the control unit is not activated in response to receiving the read request from the external apparatus via the proximity wireless communication.

20. A non-transitory computer-readable storage medium which stores a program for causing a computer to execute a method for controlling a communication apparatus,
the communication apparatus comprising:
a proximity communication unit configured to communicate with an external apparatus by proximity wireless communication, the proximity communication unit has a memory;
a control unit configured to control an operation of the communication apparatus; and
a second communication unit configured to communicate with the external apparatus, the second communication unit having a longer communication range than the proximity wireless communication,
wherein the control unit controls communication with the external apparatus via the second communication unit,
wherein the proximity communication unit transmits first data recorded in the memory to the external apparatus in response to receiving a read request from the external apparatus, and
wherein the proximity communication unit records second data received from the external apparatus in the memory in response to receiving a write request from the external apparatus,
the method comprising
in response to receiving the write request from the external apparatus via the proximity wireless communication regardless of content of the second data, providing, by the proximity communication unit, a notification to the control unit, wherein the control unit is activated,
wherein the proximity communication unit does not provide a notification to the control unit and the control unit is not activated in response to receiving the read request from the external apparatus via the proximity wireless communication.

* * * * *